United States Patent [19]

Ishizuka et al.

[11] 4,347,286
[45] Aug. 31, 1982

[54] HEAT FUSIBLE POLYIMIDE COMPOUND FILMS AND PROCESS FOR PRODUCING THE SAME

[75] Inventors: Takashi Ishizuka; Yasuhiro Moriyama; Masao Nakamura, all of Ibaraki, Japan

[73] Assignee: Nitto Electric Industrial Co., Ltd., Osaka, Japan

[21] Appl. No.: 238,283

[22] Filed: Feb. 25, 1981

[30] Foreign Application Priority Data

Feb. 25, 1980 [JP] Japan ............................. 55-23019

[51] Int. Cl.³ .................. B05D 5/10; B05D 5/12; B32B 27/08; B32B 27/28; C09J 7/02
[52] U.S. Cl. .................. 428/349; 427/385.5; 427/208.2; 428/383; 428/473.5
[58] Field of Search ............... 428/473.5, 349, 383; 427/208.2, 385.5

[56] References Cited

U.S. PATENT DOCUMENTS

| | | | |
|---|---|---|---|
| 3,505,168 | 4/1970 | Dunphy | 428/473.5 |
| 3,684,646 | 8/1972 | Kreuz et al. | 428/473.5 |
| 3,770,573 | 11/1973 | Dunphy et al. | 428/473.5 |
| 3,944,706 | 3/1976 | Czajka | 428/383 |
| 4,012,556 | 3/1977 | Keske et al. | 428/383 |
| 4,070,524 | 1/1978 | Keske | 428/383 |

*Primary Examiner*—James C. Cannon
*Attorney, Agent, or Firm*—Sughrue, Mion, Zinn, Macpeak & Seas

[57] ABSTRACT

A heat-fusible polyimide compound film which comprises a polyimide film and a heat-fusible layer composed of a polyimide precursor having a volatile material content of about 5 to about 50% by weight which is prepared by converting a part of a polyamide acid obtained by reacting a biphenyltetracarboxylic acid dianhydride represented by the general formula

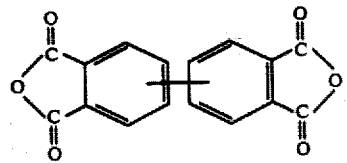

with an aromatic diamine into imide, provided on at least one surface of the polyimide film, and a process for producing the film.

16 Claims, No Drawings

HEAT FUSIBLE POLYIMIDE COMPOUND FILMS AND PROCESS FOR PRODUCING THE SAME

FIELD OF THE INVENTION

The present invention relates to a heat-fusible polyimide compound film comprising a heat-fusible layer composed of a polyimide precursor provided on a surface of a polyimide film as a base (referred to herein as a compound film) and a process for producing the same.

BACKGROUND OF THE INVENTION

Hitherto, electrically insulating tapes obtained by applying a tack-adhesive to one surface of a polyethylene film or a polyvinyl chloride film, etc., and cutting such into a suitable width have been used as electrically insulating materials for coating electrical wires or splicing cables, etc.

Recently, improvement of various types of properties including heat resistance of the electrically insulating materials has been further required. However, this requirement cannot often be met by the abovedescribed electrically insulating tapes.

Hence, in order to meet this requirement, electrically insulating materials comprising a polyimide film to which a silicone resin adhesive is applied or a thin layer of tetrafluoroethylene-hexafluoropropylene copolymer (referred to as FEP, hereinafter) is provided have been used. These electrically insulating materials cormprising a polyimide film as a main component have improved heat resistance as compared with the abovedescribed electrically insulating tapes. However, since the silicone resin adhesive of FEP has poorer heat resistance than the polyimide resin, use of them is restricted to use at a temperature lower than their heat resistant temperature. Accordingly, they are not satisfactory, yet, because the excellent heat resistance of the polyimide resin itself cannot be utilized.

SUMMARY OF THE INVENTION

The present invention provides compound films which sufficiently exhibit the inherent excellent heat resistance of a polyimide resin and have excellent adhesive properties to objects to be coated.

Specifically, the compound films according to the present invention comprise a polyimide film and a heat-fusible layer of a polyimide precursor having a volatile material content of about 5 to about 50% by weight which is prepared by converting a part of a polyamide acid obtained by reacting a biphenyltetracarboxylic acid dianhydride represented by the general formula

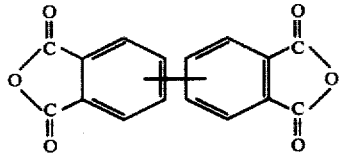

(referred to as BPDA, hereinafter) with an aromatic diamine into the imide form, provided on at least one surface of the polyimide film.

DETAILED DESCRIPTION OF THE INVENTION

The polyimide film used as a base of the compound films according to the present invention can be obtained by a process which comprises reacting an aromatic tetracarboxylic acid dianhydride, for example, pyromellitic acid dianhydride, 3,3',4,4'-benzophenonetetracarboxylic acid dianhydride, 3,3',4,4'-diphenyl ether tetracarboxylic acid dianhydride, 3,3',4,4'-diphenylpropanetetracarboxylic acid dianhydride, BPDA represented by the above-described general formula or mixtures thereof, with an aromatic diamine, for example, m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenylsulfone, 3,3'-diaminodiphenylsulfone, 1,5-diaminonaphthalene, 2,6-diaminonaphthalene, 3,4'-diaminobenzanilide or mixtures thereof in an organic polar solvent to prepare a solution of polyamide acid, forming a film by flowing the solution of polyamide acid, and heating to substantially remove the solvent simultaneously with the conversion of the polyamide acid into the imide form. The thickness of the film is generally about 5 to about 250μ or so.

In the compound films in the present invention, a heat-fusible layer composed of a polyimide precursor having a volatile material content of about 5 to about 50% by weight and preferably 5 to 30% by weight is provided on at least one surface of a polyimide film as a base.

This heat-fusible layer contains the so-called polyimide precursor wherein a part of the polyamide acid obtained by reacting BPDA represented by the general formula

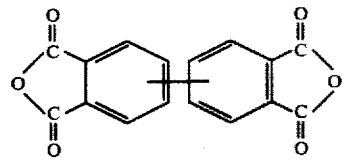

for example, 3,3',4,4'-BPDA, 2,3,3',4-BPDA or 2,3,2',3'-BPDA with the above-described aromatic diamine is converted into the imide form, as a main component, and a volatile material content of about 5 to about 50% by weight such as a part of the organic polar solvent used for the reaction of BPDA with the aromatic diamine or water formed by ring closure of polyamide acid into the imide form.

In the present invention, if the volatile material content of the heat-fusible layer composed of the polyimide precursor as a main component is less than about 5% by weight, the bonding strength on heat fusion of the compound film is inferior and mutual adhesion of the compound film or adhesion of the compound film to the object to be coated becomes insufficient. If the volatile material content is more than about 50% by weight, foaming occurs on heat fusion or the heat-fusible layer deteriorates during storage because moisture in the air is absorbed.

The volatile material content of the above-described heat-fusible layer is a value calculated using the following formula (I)

$$\text{Volatile Material Content (\% by weight)} = \frac{W - Wd}{W - Wb} \times 100 \quad \text{(I)}$$

where, in the above-described formula (I), W is the weight of the compound film before drying, Wd is the weight of the compound film after drying with heating at 350° C. for 2 hours, and Wb is the weight of the polyimide film as the base film.

The thickness of this heat-fusible layer can be varied depending on the purpose, but the thickness is generally about 5 to about 250μ.

In the present invention, compound films having a heat-shrinking property together with a heat-fusible property and excellent bonding strength can be obtained, if films having a heat-shrinking property are used as the polyimide film as the base.

A heat-shrinkable polyimide film can be obtained by a process which comprises stretching a polyimide film, obtained from reacting an aromatic tetracarboxylic acid dianhydride and an aromatic diamine as raw materials as described above, in at least a monoaxial direction with heating to a prescribed temperature and cooling which maintaining the film in this stretched state. The stretching ratio in this case preferably is in the range of about 1.05 to about 5 considering practically effective heat-shrinking ratios and working properties at stretching.

Since the compound film obtained using such a heat-shrinkable polyimide film as the base closely contacts the object to be coated with heat-shrinking occurring when the film is heated to a temperature higher than the stretching temperature of the polyimide film and higher than the softening point of the heat-fusible layer after winding the compound film on the object to be coated, the bonding, strength of the film to the film or that of the film to the object to be coated increases.

In heat-shrinkable compound films, the higher the stretching ratio of the polyimide film is, the higher the heat-shrinking ratio is. In the present invention, compound films having a heat-shrinking ratio at a maximum of about 80% are obtained. The following relationship exists between the stretching ratio and the heat-shrinking ratio. Namely, a film having a stretching ratio of 2 shrinks with heating to 50% at a maximum, that having a stretching ratio of 3 shows a heat-shrinking ratio at a maximum of about 67%, that having a stretching ratio of 4 shows a heat shrinking ratio at a maximum of about 75%, and that having a stretching ratio of 5 shows a heat shrinking ratio at a maximum of about 80%.

The above-described heat-shrinking ratio is a calculated value obtained using the following formula (II) after measurement which comprises printing two marks at a fixed interval (the mark interval in this case is L) in the stretching direction on the heat-shrinkable polyimide film as the base of the compound films, heating the film at a prescribed temperature to cause heat-shrinking to occur, cooling the film to room temperature, and measuring the interval between the marks ($L_o$).

$$\text{Heat-Shrinking Ratio (\%)} = \frac{L - L_o}{L} \times 100 \quad \text{(II)}$$

Further, in the present invention, not only the polyimide film as the base but also the heat-fusible layer may be heat-shrinkable. Such a compound film in which both the base and the heat-fusible layer are heat-shrinkable is obtained by stretching using a process providing heat-shrinking properties to the polyimide film as described above, after formation of the heat-adhesive layer on the base.

In production of the compound films of the present invention, the process comprises applying a solution of polyamide acid obtained by reacting BPDA represented by the general formula

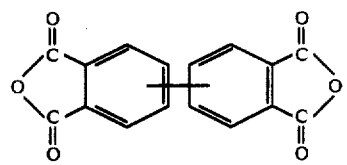

with an aromatic diamine in an organic polar solvent to at least one surface of a polyimide film, and drying thereafter with heating to convert a part of the polyamide acid into the imide form while controlling the volatile material content to about 5 to 50% by weight, by which a heat-fusible layer composed of a polyimide precursor is formed.

In the process of the present invention, in order to obtain a solution of polyamide as the heat-fusible layer forming material, BPDA represented by the above-described general formula and the aromatic diamine are reacted in an organic polar solvent such as N,N-dialkylcarboxylamides such as N,N-dimethylformamide, N,N-diethylformamide, N,N-dimethylacetamide, N,N-dimethylmethoxyacetamide or N,N-diethylacetamide, etc., dimethyl sulfoxide, N-methyl-2-pyrrolidone, dimethyl sulfone or hexamethylphosphoramide, etc.

The concentration of BPDA and aromatic diamine in the organic polar solvent during the reaction may be varied depending on various factors, but the concentration is generally about 5 to about 30% by weight and preferably 10 to 25% by weight. Further, the reaction temperature is generally about 80° C. or less and preferably 5° to 50° C., and the reaction time is generally about 1 to about 10 hours or so.

Further, in the present invention, the BPDA, the aromatic diamine and the organic polar solvent may be used alone, respectively, or may be used as a mixture of two or more kinds thereof, respectively. In addition, solvents including aromatic hydrocarbons such as benzene, toluene or xylene, etc., ethers such as dioxane, etc., ketones such as methyl ethyl ketone, etc., alcohols such as methanol or ethanol, etc., or phenols such as phenol or cresol, etc., can be used together with the organic polar solvent.

When the BPDA reacts with the aromatic diamine in the organic polar solvent, polyamide acid is formed and the viscosity of the solution increases as the reaction proceeds. In the present invention, a solution of polyamide acid having an inherent viscosity of about 0.5 or more is preferred. A heat-fusible layer formed on the polyimide film using the solution of polyamide acid having an inherent viscosity of about 0.5 or more has particularly high bonding strength to the polyimide film and excellent elasticity. Accordingly, a compound film having such a heat-fusible layer has a characteristic that cracking does not occur on the heat-fusible layer or separation of the layer from the polyimide film as the base does not occur when an object covered with the compound film is bent after heat-fusion.

The inherent viscosity of the solution of polyamide acid used in the present invention is a calculated value which is obtained using the following formula (III) after the viscosity of a solution obtained by dissolving polyamide acid removed from the solution of polyamide acid in a prescribed solvent is measured.

$$\text{Inherent Viscosity} = \frac{\text{Natural Logarithm (log e)} \frac{\text{Viscosity of Solution}}{\text{Viscosity of Solvent}}}{C} \quad \text{(III)}$$

where C in the above described formula (III) is the number of grams of polyamide acid in 100 ml of the solution.

The resulting solution of polyamide acid is viscous, the viscosity of which measured using a B-type viscometer at 30° C. is generally about 10 to $10^8$ poises when the concentration of polyamide acid is 5 to 30% by weight.

In the present invention, the solution of polyamide acid obtained by reacting BPDA with the aromatic diamine in an organic polar solvent as described above is then applied to at least one surface of the polyimide film as the base. Various coating methods can be utilized to apply the solution of polyamide acid to the polyimide film. Examples of suitable methods include (a) a method which comprises immersing the polyimide film in the solution of polyamide acid, removing the film and squeezing out the excess amount of polyamide acid using a doctor knife, (b) a method which comprises applying the solution of polyamide acid to a surface of the polyimide film by transfer using a reverse roll coater, and (c) a method which comprises applying the solution of polyamide acid to a surface of the polyimide film by extrusion using a T die.

In the above-described step for coating, the solution of polyamide acid may be applied directly to the surface of the polyimide film. It is also possible to apply the solution after the viscosity thereof is adjusted by dilution with a suitable solvent or by heating the solution.

The polyimide film to which the solution of polyamide acid was applied in the above-described manner is then dried with heating. The drying with heat is carried out in order to convert a part of the polyamide acid in the solution applied to the surface of the polyimide film into the imide form simultaneously with control of the volatile material content to about 5 to about 30% by weight, by which a heat-fusible layer composed of a polyimide precursor as a main component is formed. The heating temperature, which may be varied depending on various factors, is generally about 50° to 200° C. and preferably 80° to 150° C.

In the step for drying with heat, it is essential for the volatile material content of the heat-fusible layer to be controlled within the above-described range. With respect to imide conversion ratio, the close attention required for the volatile material content is not necessary for achieving the objects of this invention. The imide comversion ratio is obtained by calculating the ratio of light absorbance at 1,770 cm$^{-1}$ in the infrared absorption spectrum due to absorption of the imide group to the light absorbance at 1,720 cm$^{-1}$ due to absorption of the amide acid group.

Further, in the present invention, it is possible to use the above-described heat-shrinkable polyimide film as the base, too. In this case, the step for applying the solution of polyamide acid to the heat-shrinkable polyimide film and the subsequent step for drying with heat are carried out at a temperature lower than the heat-shrinking point of the heat-shrinkable film.

The compound films of the present invention obtained as described above can be widely used not only as electrically insulating materials but also as heat-insulating materials and anticorrosive materials for piping. Further, it is possible to obtain elastic polyimide laminates by superposing desired sheets of the film and heat-pressing or to obtain laminates composed of different materials by superposing the film on metal or non-metal foils or plates, etc.

According to the present invention, the compound films can be easily applied to objects to be coated, because the heat-fusible layer composed of the polyimide precursor as a main component wound on the objects to be coated softens by heating to the desired temperature with firm bonding to the objects to be coated occurring.

Further, since the heat-fusible layer has a volatile material content of about 5 to about 50% by weight, the bonding strength of the compound film to the compound film or that of the compound film to the object to be coated is high. In addition, foaming does not occur on heat fusion and the heat-fusible layer does not deteriorate during storage of the compound film, because moisture in the air is not absorbed therein.

Moreover, since the compound films can be used without providing a silicone resin adhesive layer or an FEP thin layer as an adhesive layer on the object to be coated, the excellent heat resistance of polyimide resin itself is sufficiently exhibited.

The heat-shrinkable compound films have a characteristic that adhesion to the object to be coated at heat-fusion is even better.

Further, the process of the present invention has characteristics that the number of steps is relatively small and operation in each step is simple and useful compound films can be easily obtained.

The present invention is illustrated in greater detail with reference to the following examples. Unless otherwise indicated, all parts, percents, ratios and the like are by weight.

EXAMPLE 1

1,176 g (4 mols) of 3,4,3',4'-BPDA and 800 g (4 mols) of 4,4'-diaminodiphenyl ether were reacted in 14.5 kg of N-methyl-2-pyrrolidone at 5°–30° C. for 5 hours to prepare a solution of polyamide acid having a solution viscosity (value at 30° C. by a B-type viscometer) of 2,700 poises and an inherent viscosity of 2.5.

Then, this solution of polyamide acid was applied to one surface of a long polyimide film (produced by Du Pont Co., trade name: Kapton H) having a width of 508 mm and a thickness of 50μ obtained from pyromellitic acid dianhydride and an aromatic diamine using a knife coater and dried with heating for 15 minutes by passage through a drying furnace at 150° C. to obtain a long compound film having a heat-fusible layer with a volatile material content of 35% by weight and a thickness of 24μ formed on the surface.

Thereafter, this long compound film was cut in the longitudinal direction to a width of 12.5 mm to produce a tape. The tape was wound on a square copper wire having the section of a width of 7 mm and a thickness of 1.5 mm and a length of 300 mm using a half-wrapping method and heated for 10 minutes in a drying furnace at 180° C. Thereafter, it was allowed to stand for 10 minutes in a drying furnace at 300° C., by which the film firmly bonded to the copper wire. After cooling, separation of the film from the copper wire was not observed when it was bent at an angle of 90 degrees.

Further, when this compound film was stored for 1 month under an atmosphere of 25° C., 50% RH, deterioration of the heat-fusible layer did not occur due to moisture absorption.

For comparison, a compound film having a heat-fusible layer having a volatile material content of 60% by weight and a thickness of 30μ was obtained using the same procedures as described above except that heating after application of the solution of polyamide acid was carried out at 120° C. for 12 minutes. When the same winding evaluation as described above was carried out using this compound film, separation of the compound film from the copper wire was observed by bending at an angle of 90°.

Further, on evaluation of moisture absorption, the heat-fusible layer became cloudy and deteriorated due to absorption of moisture when the compound film was stored for 1 month in an atmosphere of 25° C., 50% RH.

EXAMPLE 2

644 g (2 mols) of 3,3',4,4'-benzophenonetetracarboxylic acid dianhydride and 400 g (2 mols) of 4,4'-diaminodiphenyl ether were reacted in 7.6 kg of N,N-dimethylacetamide at 5°-30° C. for 5 hours to prepare a solution of polyamide acid having a solution viscosity (value at 30° C. by a B-type viscometer) of 1,200 poises and an inherent viscosity of 1.21.

Thereafter, this solution of polyamide acid was processed using a flow molding process to produce a film, which was dried at 300° C. for 30 minutes to obtain a polyimide film having a thickness of 25μ.

Then, to one surface of this polyimide film, a solution of polyamide acid as described in Example 1 was applied by extrusion using a T die and dried for 20 minutes by passage through a drying furnace at 170° C. to obtain a compound film having a heat-fusible layer having a volatile material content of 12% by weight and a thickness of 20μ.

When this compound film was wound on the same type of copper wire as in Example 1 and allowed to stand for 10 minutes in a drying furnace at 200° C. and thereafter for 10 minutes in a drying furnace at 300° C., adhesion to the copper wire was excellent and separation did not occur on bending at an angle of 90° after cooling.

EXAMPLE 3

A film was obtained by flow molding a solution of polyamide acid obtained as in Example 1 on a stainless endless belt having a widlth of 400 mm and a length of 20 m and drying for 20 minutes in a drying furnace at 150° C. at a rate of 0.2 m/min. It was further dried for 15 minutes in a drying furnace heated to 250°-300° C. to obtain a long polyimide film having a thickness of 45μ.

Then, this long polyimide film was introduced into two pairs of pinch rolls disposed in a heating furnace kept at 250° C. at a prescribed interval. The rate of the pinch rolls at the drawing-out side was controlled to 0.5 m/min and that of the pinch rolls at the winding side was controlled to 1.0 m/min, by which the film was stretched in the longitudinal direction to a stretching ratio of 2 to obtain a long heat-shrinkable polyimide film having a thickness of 32μ.

In order to evaluate the heat shrinking ratio of the resulting heat-shrinkable polyimide film, the film was cut in the longitudinal direction to produce a long strip having a width of 20 mm and a length of 200 mm, and two marks were printed at an interval of 100 nm. This test strip was allowed to stand in a drying furnace at 300° C. for 5 minutes, and it was then removed from the drying furnace and cooled to room temperature. When the interval between the marks was measured, it was 50 mm which meant tht the heat-shrinking ratio was 50% and the stretching was completely eliminated.

Then, to one surface of this heat-shrinkable polyimide film, the solution of polyamide acid produced as in Example 1 as applied by extrusion using a T die and dried for 20 minutes by passage through a drying furnace at 160° C. to obtain a compound film having a heat-fusible layer with a volatile material content of 18% by weight and a thickness of 25μ.

When this compound film was wound on the same type of copper wire as in Example 1 and allowed to stand for 10 minutes in a drying furnace at 200° C. and thereafter for 10 minutes in a drying furnace at 300° C., the film heat-fused simultaneously with heat-shrinking to excellent adhesion occurring and separation did not occur on bending at an angle of 90° after cooling.

EXAMPLE 4

1,176 g (4 mols) of 3,4,3',4'-BPDA and 792 g (4 mols) of 4,4'-diaminodiphenylmethane were reacted in 11.2 kg of N,N-dimethylformamide at 5°-30° C. for 5 hours to obtain a solution of polyamide acid having a solution viscosity (value at 30° C. by a B-type viscometer) of 5,600 poises and an inherent viscosity of 1.8.

Then, a film was obtained by flow molding this solution of polyamide acid on a stainless endless belt in the same manner as in Example 3 and drying for 13 minutes in a drying furnace at 135° C. It was further dried for 30 minutes in a drying furnace at 250°-300° C. to obtain a long polyimide film having a thickness of 42μ.

Then, this long polyimide film was introduced between a pair of metal rolls having a width of 500 mm and a diameter of 350 mm kept at 300° C. to stretch with pressing (the stretching direction was the longitudinal direction of the film), by which a long heat-shrinkable polyimide film having a stretching ratio of 1.5 and a thickness of 30μ was obtained.

When the maximum heat-shrinking ratio of this long heat-shrinkable polyimide film was measured in the same manner as in Example 3 except that the heating temperature was 350° C., the ratio was 33% and the stretching was completely eliminated.

Thereafter, to this heat-shrinkable polyimide film, the above-described solution of polyamide acid was applied using a reverse roll coater and dried for 20 minutes by passage through a drying furnace at 135° C. to obtain a compound film having a heat-fusible layer with a volatile material content of 7.8% by weight and a thickness of 21μ.

When this compound film was wound on the same type of copper wire as in Example 1 and allowed to stand for 10 minutes in a drying furnace at 180° C. and thereafter for 10 minutes in a drying furnace at 350° C., heat-fusion of the film occurred simultaneously with heat-shrinking to obtain excellent adhesion and separation did not occur by bending at an angle of 90° after cooling.

For comparison, a compound film having a heat-fusible layer with a volatile material content of 2% by weight and a thickness of 20μ was obtained using the same procedure as described above except that heating after application of the solution of polyamide acid was carried out at 150° C. for 10 minutes. When the same winding examination as described above was carried out using this compound film, separation of the compound film from the copper wire was observed on bending at an angle of 90°.

EXAMPLE 5

1,176 g (4 mols) of 3,4,3',4'-BPDA and 800 g (4 mols) of 4,4'-diaminodiphenyl ether were reacted in 17.8 kg of N-methyl-2-pyrrolidone at 5°–30° C. for 6 hours to obtain a solution of polyamide acid having a solution viscosity (value at 30° C. by B-type viscometer) of 15,200 poises and an inherent viscosity of 3.5.

After the viscosity of this solution of polyamide acid was adjusted by heating to 45° C., the solution was allowed to flow onto the same type of endless belt as used in Example 3 and dried for 20 minutes in a drying furnace at 150° C. to form a film having a volatile material content of 27% by weight. The film was further dried for 15 minutes in a heating furnace at 250°–300° C. to obtain a long polyimide film having a thickness of 51μ.

Thereafter, this long polyimide film was stretched using a stretching apparatus as described in Example 4 under conditions of a temperature of 250° C., a rate of pinch rolls at the drawing-out side of 0.5 m/min and a rate of pinch rolls at the winding side of 1.5 m/min to a stretching ratio of 3 to obtain a long heat-shrinkable polyimide film having a thickness of 26μ.

When the heat-shrinking ratio of this heat-shrinkable polyimide film was measured in the same manner as in Example 3, the ratio was 67% which meant that stretching was completely eliminated.

On the other hand, 1,176 g (4 mols) of 2,3,3',4'-BPDA, 640 g (3.2 mols) of 4,4'-diaminodiphenyl ether and 86.4 g (0.8 mol) of m-phenylenediamine were reacted in 10.8 kg of N,N-dimethylformamide at 5°–30° C. for 5 hours to obtain a solution of polyamide acid having a solution viscosity (value at 30° C. by a B-type viscometer) of 3,200 poises and an inherent viscosity of 1.2.

Then, this solution of polyamide acid was applied to one surface of the above-described long heat-shrinkable polyimide film and dried in the same manner as in Example 3 to obtain a compound film having a heat-fusible layer with a volatile material content of 15.5% by weight and a thickness of 30μ.

When this compound film was wound on the same type of copper wire as in Example 1 and allowed to stand for 10 minutes in a drying furnace at 180° C. and thereafter for 10 minutes in a drying furnace at 300° C., heat-fusion of the film occurred simultaneously with heat-shrinking to cause excellent adhesion to be obtained and separation did not occur on bending at an angle of 90° after cooling.

While the invention has been described in detail and with reference to specific embodiments thereof, it will be apparent to one skilled in the art that various changes and modifications can be made therein without departing from the spirit and scope thereof.

What is claimed is:

1. A heat-fusible polyimide compound film which comprises a polyimide film and a heat-fusible layer composed of a polyimide precursor having a volatile material content of about 5 to about 50% by weight which is prepared by converting a part of a polyamide acid obtained by reacting a biphenyltetracarboxylic acid dianhydride represented by the general formula

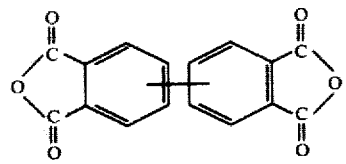

with an aromatic diamine into imide, provided on at least one surface of said polyimide film.

2. The heat-fusible polyimide compound film according to claim 1, wherein the polyimide film is a heat-shrinkable polyimide film.

3. The heat-fusible polyimide compound film according to claim 1, wherein said polyimide film comprises a film produced from the reaction product of an aromatic tetracarboxylic acid dianhydride and an aromatic diamine.

4. The heat-fusible polyimide compound film according to claim 3, wherein said aromatic tetracarboxylic acid dianhydride is pyromellitic acid dianhydride, 3,3',4,4'-benzophenonetetracarboxylic acid dianhydride, 3,3',4,4'-diphenyl ether tetracarboxylic acid dianhydride, 3,3',4,4'-diphenylpropanetetracarboxylic acid dianhydride, 3,3',4,4'-biphenyltetracarboxylic dianhydride, 2,3,3',4-biphenyltetracarboxylic acid dianhydride, or 2,3,2',3'-biphenyltetracarboxylic acid dianhydride and said aromatic diamine is m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenyl sulfone, 3,3'-diaminodiphenyl sulfone, 1,5-diaminonaphthalene, 2,6-diaminonaphthalene, or 3,4'-diaminobenzanilide.

5. The heat-fusible polyimide compound film according to claim 1, wherein said biphenyltetracarboxylic acid dianhydride is 3,3',4,4'-biphenyltetracarboxylic acid dianhydride, 2,3,3',4-biphenyltetracarboxylic acid dianhydride or 2,3,2',3'-biphenyltetracarboxylic acid dianhydride and said aromatic diamine is m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenyl sulfone, 3,3'-diaminodiphenyl sulfone, 1,5-diaminonaphthalene, 2,6-diaminonaphthalene or 3,4'-diaminobenzanilide.

6. The heat-fusible polyimide compound film according to claim 2, wherein said heat-shrinkable polyimide film is a film stretched in at least one direction to a stretching ratio of about 1.05 to about 5.

7. The heat-fusible polyimide compound film according to claim 1, wherein the heat-shrinkable polyimide film is a film stretched biaxially with a stretching ratio in each direction of about 1.05 to about 5.

8. The heat-fusible polyimide compound film according to claim 1, wherein a solution of said polyamide acid has an inherent viscosity of about 0.5 or more.

9. A process for producing a heat-fusible polyimide compound film which comprises applying a solution of a polyamide acid obtained by reacting a biphenyltetracarboxylic acid dianhydride represented by the general formula

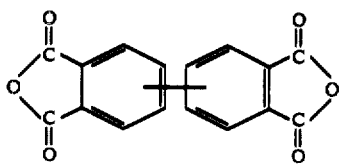

with an aromatic diamine in an organic polar solvent to at least one surface of a polyimide film, and drying thereafter with heating to convert a part of said polyamide acid into the imide form while maintaining the volatile material content at about 5 to about 60% by weight, by which a heat-fusible layer composed of a polyimide precursor is formed.

10. The process for producing a heat-fusible polyimide compound film according to claim 9, wherein the polyimide film is a heat-shrinkable polyimide film.

11. The process for producing a heat-fusible polyimide compound film according to claim 9, wherein said polyimide film comprises a film produced from the reaction product of an aromatic tetracarboxylic acid dianhydride and an aromatic diamine.

12. The process for producing a heat-fusible polyimide compound film according to claim 11, wherein said aromatic tetracarboxylic acid dianhydride is pyromellitic acid dianhydride, 3,3',4,4'-benzophenonetetracarboxylic acid dianhydride, 3,3',4,4'-diphenyl ether tetracarboxylic acid dianhydride, 3,3',4,4'-diphenylpropanetetracarboxylic acid dianhydride, 3,3',4,4'-biphenyltetracarboxylic dianhydride, 2,3,3',4-biphenyltetracarboxylic acid dianhydride or 2,3,2',3'-biphenyltetracarboxylic acid dianhydride and said aromatic diamine is m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenyl sulfone, 3,3'-diaminodiphenyl sulfone, 1,5-diaminonaphthalene, 2,6-diaminonaphthalene, or 3,4'-diaminobenzanilide.

13. The process for producing a heat-fusible polyimide compound film according to claim 11, wherein said biphenyltetracarboxylic acid dianhydride is 3,3',4,4'-biphenyltetracarboxylic acid dianhydride, 2,3,3',4-biphenyltetracarboxylic acid dianhydride or 2,3,2',3'-biphenyltetracarboxylic acid dianhydride and said aromatic diamine is m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenyl sulfone, 3,3'-diaminodiphenyl sulfone, 1,5-diaminonaphthalene, 2,6-diaminonaphthalene, or 3,4'-diaminobenzanilide.

14. The process for producing a heat-fusible polyimide compound film according to claim 11, wherein said heat-shrinkable polyimide film is a film stretched in at least one direction to a stretching ratio of about 1.05 to about 5.

15. The process for producing a heat-fusible polyimide compound film according to claim 11, wherein the heat-shrinkable polyimide film is a film stretched biaxially with a stretching ratio in each direction of about 1.05 to about 5.

16. The process for producing a heat-fusible polyimide compound film according to claim 11, wherein a solution of said polyamide acid has an inherent viscosity of about 0.5 or more.

* * * * *